(12) United States Patent
Koskinen

(10) Patent No.: US 7,588,106 B2
(45) Date of Patent: Sep. 15, 2009

(54) PONTOON CRAWLER TRACK ASSEMBLY

(75) Inventor: Kalevi Koskinen, Lappi (FI)

(73) Assignee: Remu Oy, Ähtäri (FI)

( * ) Notice: Subject to any disclaimer, the term of this patent is extended or adjusted under 35 U.S.C. 154(b) by 384 days.

(21) Appl. No.: 10/593,975

(22) PCT Filed: Dec. 15, 2004

(86) PCT No.: PCT/FI2004/000764

§ 371 (c)(1),
(2), (4) Date: Sep. 22, 2006

(87) PCT Pub. No.: WO2005/090103

PCT Pub. Date: Sep. 29, 2005

(65) Prior Publication Data

US 2008/0223279 A1 Sep. 18, 2008

(30) Foreign Application Priority Data

Mar. 23, 2004 (FI) .................................. 20040436

(51) Int. Cl.
B60F 3/00 (2006.01)

(52) U.S. Cl. .................... 180/9.48; 440/12.63; 114/267

(58) Field of Classification Search ................ 180/9.48, 180/6.48; 114/267; 440/12.63, 12.64
See application file for complete search history.

(56) References Cited

U.S. PATENT DOCUMENTS

| 3,715,146 | A | * | 2/1973 | Robertson | 305/181 |
| 4,021,873 | A | * | 5/1977 | Francois | 114/345 |
| 4,817,554 | A | * | 4/1989 | Prestenbach | 440/12.64 |
| 4,846,092 | A | * | 7/1989 | Wilson | 440/12.64 |
| 4,938,546 | A | * | 7/1990 | Simmons | 305/180 |
| 4,961,395 | A | * | 10/1990 | Coast | 440/12.64 |
| 5,638,908 | A | * | 6/1997 | Masumoto et al. | 172/815 |
| 5,839,802 | A | | 11/1998 | Sheets | |
| 6,315,622 | B1 | | 11/2001 | Wilson, Sr. et al. | |
| 6,374,933 | B1 | * | 4/2002 | Ruppert et al. | 180/9.48 |
| 6,482,053 | B1 | | 11/2002 | Prestenbach | |
| 6,918,801 | B2 | * | 7/2005 | Wilson et al. | 440/12.63 |
| 6,921,304 | B2 | * | 7/2005 | Hewitt | 440/12.52 |
| 7,373,999 | B2 | * | 5/2008 | Haringer | 180/9.48 |

* cited by examiner

Primary Examiner—Tony H. Winner
(74) Attorney, Agent, or Firm—Venable LLP; Eric J. Franklin

(57) ABSTRACT

A pontoon crawler track assembly intended to be used as a crawler-track-driven undercarriage in a working machine. The assembly includes a mounting frame and pontoon members. The mounting frame includes a coupler to couple the pontoon crawler track assembly with the working machine and a fastener for attachment of box-structured, hollow pontoon members at the sides of the mounting frame. Each pontoon member includes a crawler track arrangement, which is arranged moveable by way of an internal power transmission arrangement. The breadth of the pontoon crawler track assembly is adjustable. Actuators adjust a breadth of the assembly in a way that a working machine equipped with the pontoon crawler track assembly may be brought, by changing the distance between its pontoon members with the actuators, operating by auxiliary power, first into a narrowed position particularly and on the other hand into a broadened position.

17 Claims, 7 Drawing Sheets

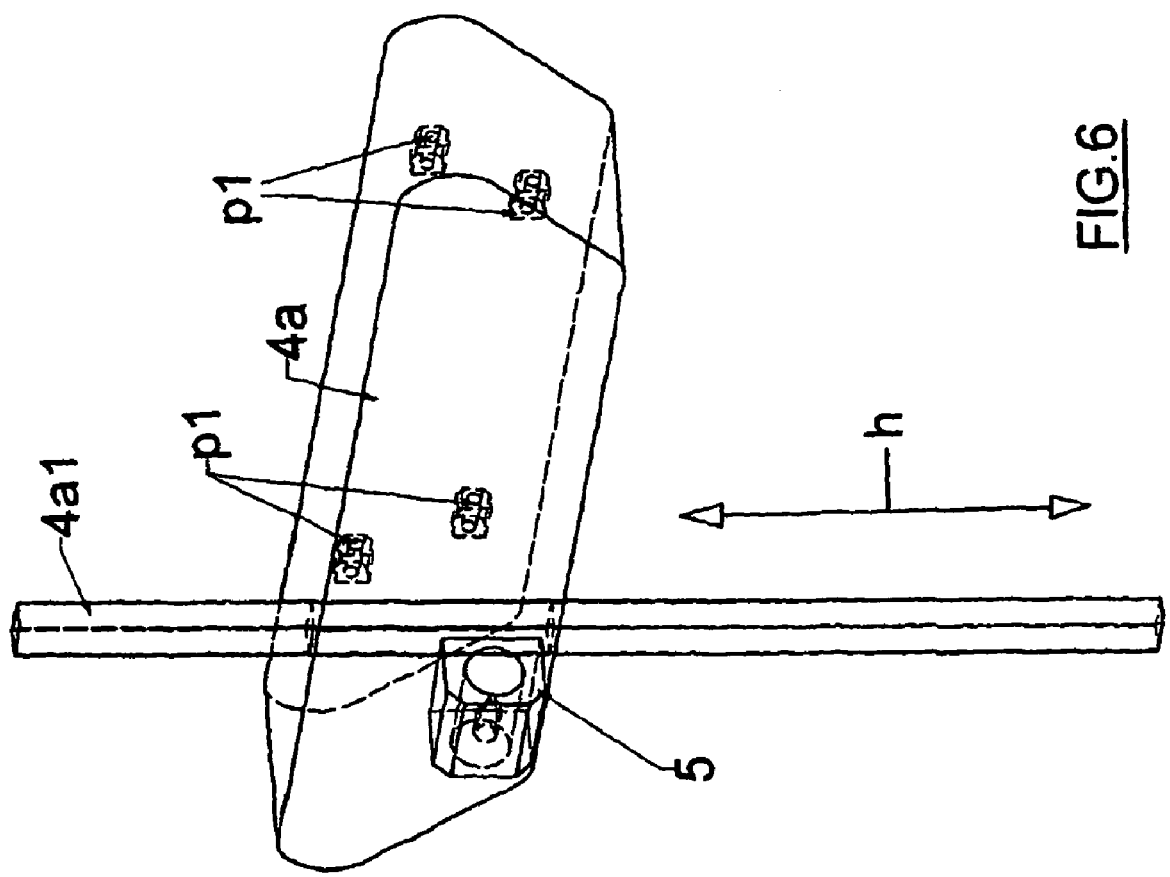

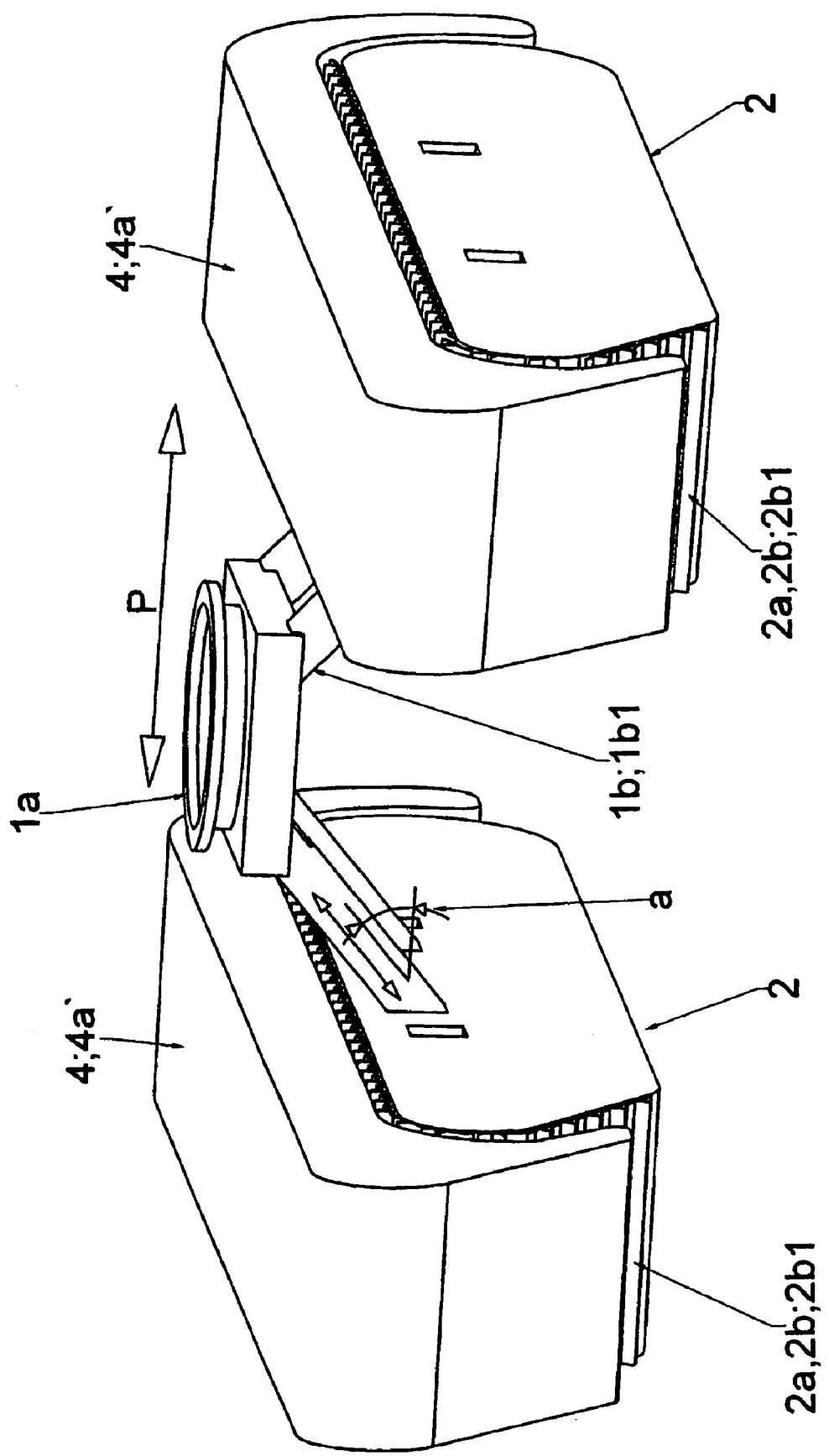

PONTOON CRAWLER TRACK ASSEMBLY

CROSS-REFERENCE TO RELATED APPLICATIONS

Figure 1:
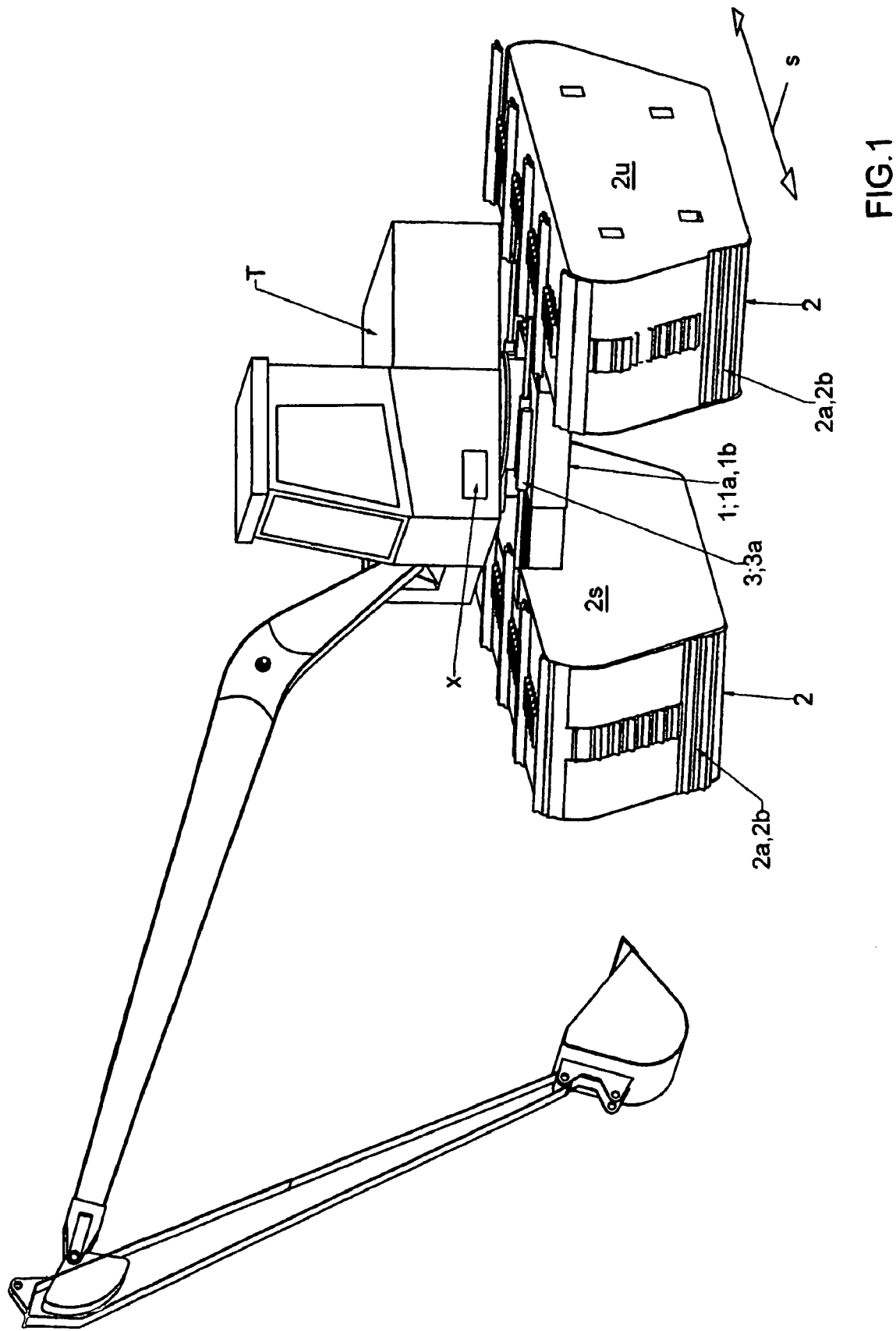

This application claims priority to Finnish patent application 20040436 filed 23 Mar. 2004 and is the national phase under 35 U.S.C. § 371 of PCT/FI2004/000764 filed 15 Dec. 2004.

FIELD OF THE INVENTION

The invention relates to a pontoon crawler track assembly, which is intended to be used as a crawler-track-driven undercarriage in a working machine, such as an excavator, a drilling or a piling machine or like, operating particularly in water, which comprises a mounting frame and pontoon members. The mounting frame has coupling means to couple the pontoon crawler track assembly with a working machine and fastening means for attachment of the box-structured, hollow pontoon members at the sides of the mounting frame. Each pontoon member is equipped with a crawler track arrangement, which is arranged moveable by way of an internal power transmission arrangement. Furthermore the breadth of the pontoon crawler track assembly is arranged adjustable.

BACKGROUND OF THE INVENTION

It is nowadays known to use a pontoon crawler track assembly as described above as a crawler-track-driven undercarriage particularly in working machines operating in water, such as excavators. A working machine, being equipped like this, is transported to its operating site usually by road as a so called extra wide transportation, which always requires extra arrangements including separate warning vehicles etc. After the operation the working machine is being returned to its maintenance point, whereby a usual undercarriage is being replaced to the same, in case the next operation is related to usual ground excavation. This is why the measures related to a preliminary preparation and transportation of a working machine, being utilized in water, are first of all very laborious to perform and on the other hand get disproportionately expensive particularly due to those special arrangements needed for road transportations.

Furthermore in U.S. Pat. No. 6,315,622 there has been presented a pontoon crawler track assembly suitable for the above purpose, which comprises a mounting frame, which is put together from parts in a way that it includes a middle part, to be attached e.g. to a fastening beam of an excavator, and furthermore fastening parts, to be attached to the ends of the middle part by screw joints, in order to fasten the actual pontoon members equipped with crawler tracks. One meaning of the above solution is that by altering particularly the lengths of the fastening parts for the pontoon members, it is possible to vary the breadth of the pontoon crawler track assembly, acting as an undercarriage of an excavator, to be most suitable for each purpose.

The solution according to U.S. Pat. No. 6,315,622 does not bring about any significant advantage with respect to the problems, being explained before, because it is based on the fact that the undercarriage must be first of all put together manually from separate parts by applying several bolt joints, which must be carried out in practice usually indoors. On the other hand it must still be transported separately in its operating breadth to an installation site or together with the excavator, while being attached to the same. This is why, also in connection with this type of solution, there is still a need to use extra wide road transportations. In addition to that, for each differing operating breadth of the undercarriage, fastening parts having deviating measures must be manufactured/stored.

SUMMARY OF THE INVENTION

It is an aim of the pontoon crawler track assembly according to the present invention to achieve a decisive improvement in the problems described above and thus to raise essentially the level of prior art in the field. In order to achieve this aim, the pontoon crawler track assembly according to the invention is primarily characterized in that it has actuators for adjusting its breadth in a way that a working machine equipped with a pontoon crawler assembly may be brought, by changing the distance between its pontoon members by means of said actuators, operating by auxiliary power, first of all into a narrowed position particularly with a view to road transportation or the like and on the other hand into a broadened position particularly with a view to operating in water.

As the most important advantages of the crawler track assembly according to the invention may be mentioned simplicity and efficiency of its structure, manufacturing and use, whereby with very simple technical solutions it is possible to put together a pontoon crawler track assembly, which can, when being attached to the working machine, first of all be adjusted to a desired optimum operating breadth at any given time and on the other hand be narrowed to its minimum breadth in a way that e.g. in road transportations of the working machine traffic arrangements are not needed, which is the case with extra wide transportations. This is based on the fact that extremely simple structures have been utilized in the pontoon crawler track assembly particularly for the part of the power transmission arrangements moving the crawler track arrangements of the pontoon members so that for their part it is possible to achieve significant cost savings from the point of view of manufacturing. This has been achieved by using in each pontoon member only one power transmission arrangement, being placed essentially at the center of the pontoon member and in which each crawler track part of the crawler track arrangement is attached to the power transmission chain from its middle.

As an advantageous embodiment, the crawler track arrangement comprises furthermore shorter and longer crawler track parts that are arranged in a way that the mutual distance of the longer crawler track parts from each other in the longitudinal direction is greater than the total length of the mounting frame, which arrangements together with a cavity, existing in the internal side wall of the pontoon member, enable withdrawing of the mounting frame partially inside the pontoon member between the first crawler track parts. In usual crawler track solutions there has been used traditionally two power transmission arrangements, being placed at opposite edges of the crawler track frame, between which the crawler track parts have been fastened, which does not enable withdrawing of the fastening frame inside the pontoon members. On the other hand according to the invention it is also possible to arrange the pontoon members to move simultaneously downwards during the sideward movement by means of the fastening beams, being placed in inclined positions, which enables adjustment of the operating height of the working machine.

One crucial advantage of the pontoon crawler track assembly according to the invention is thus the adjustment of the operating breadth of the undercarriage, whereby those manual installation stages and extra spare parts, required by e.g. the solution according to U.S. Pat. No. 6,315,622, may be totally avoided thanks to hydraulic cylinders, to be controlled advantageously from the the working machine's cab and operated by means of the operating machine's hydraulic system. The efficiency of the hydraulic cylinders may be optimized particularly thanks to the fact that the forces needed for adjustment may be minimized by lifting the pontoon member, to be adjusted at any given time, e.g. by means of the bucket of the excavator, operating as the working machine, prior to its positioning.

Advantageous embodiments of the pontoon crawler track assembly according to the invention are described herein.

BRIEF DESCRIPTION OF THE INVENTION

Figure 2:
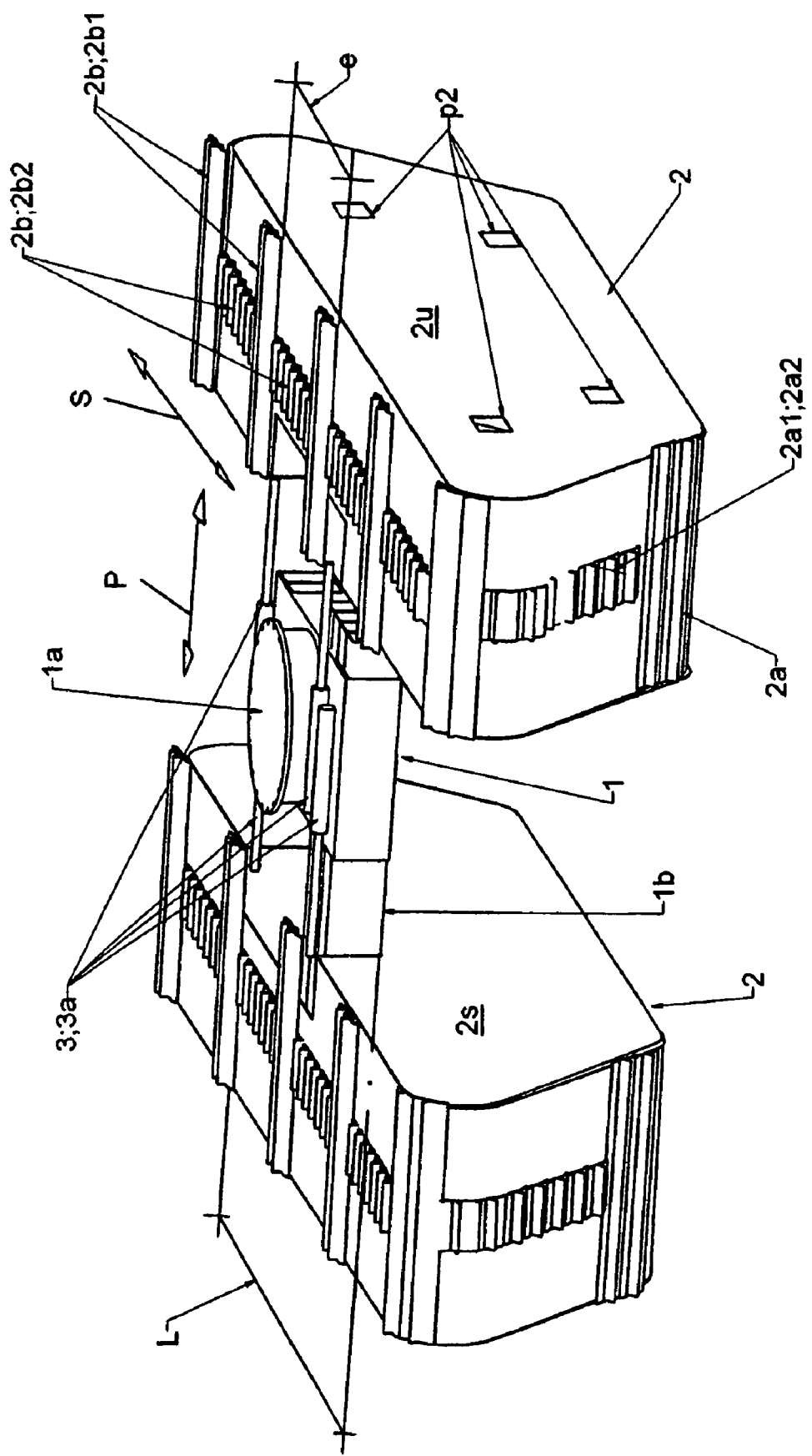
Figure 3:
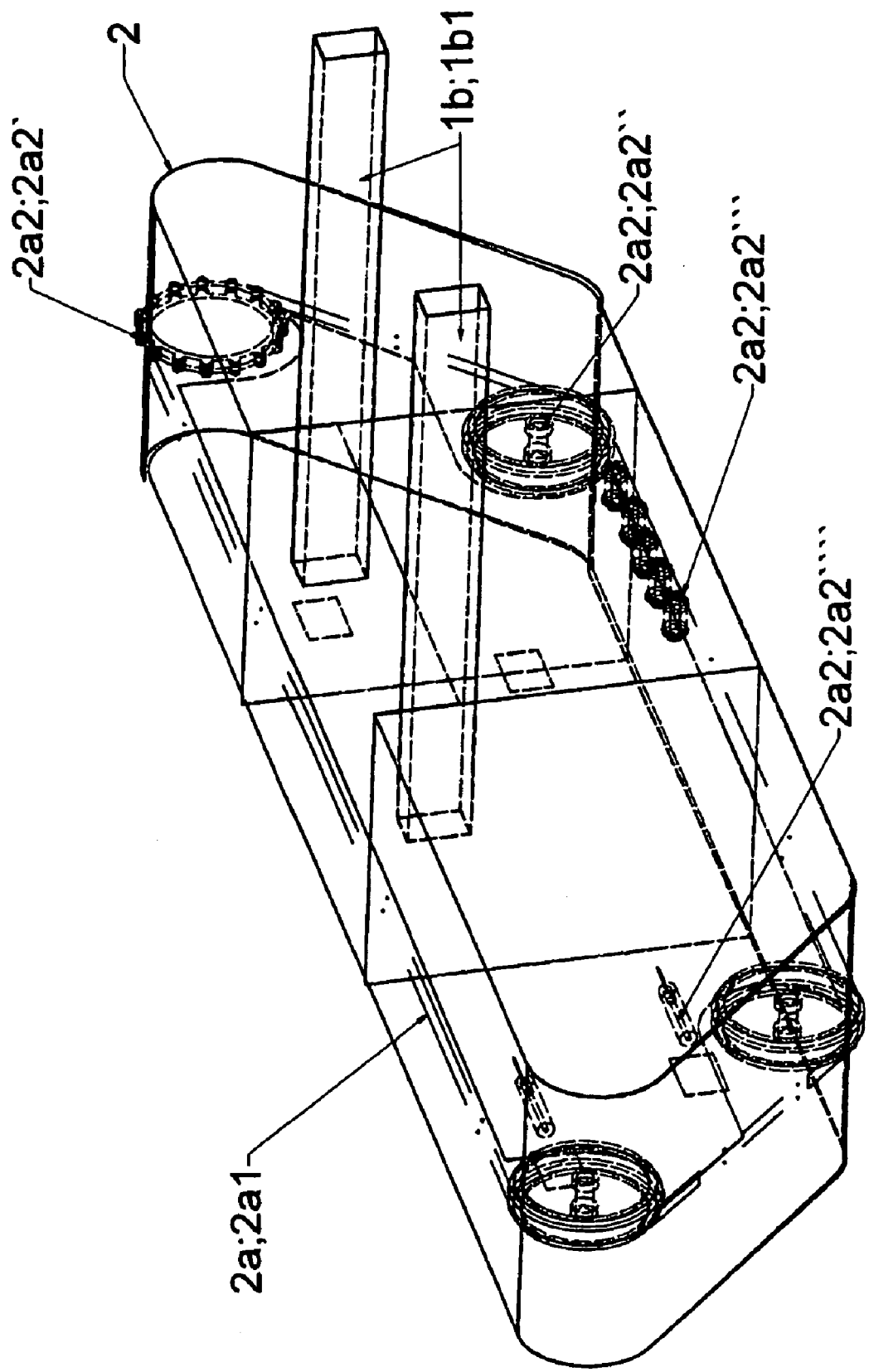
Figure 4:
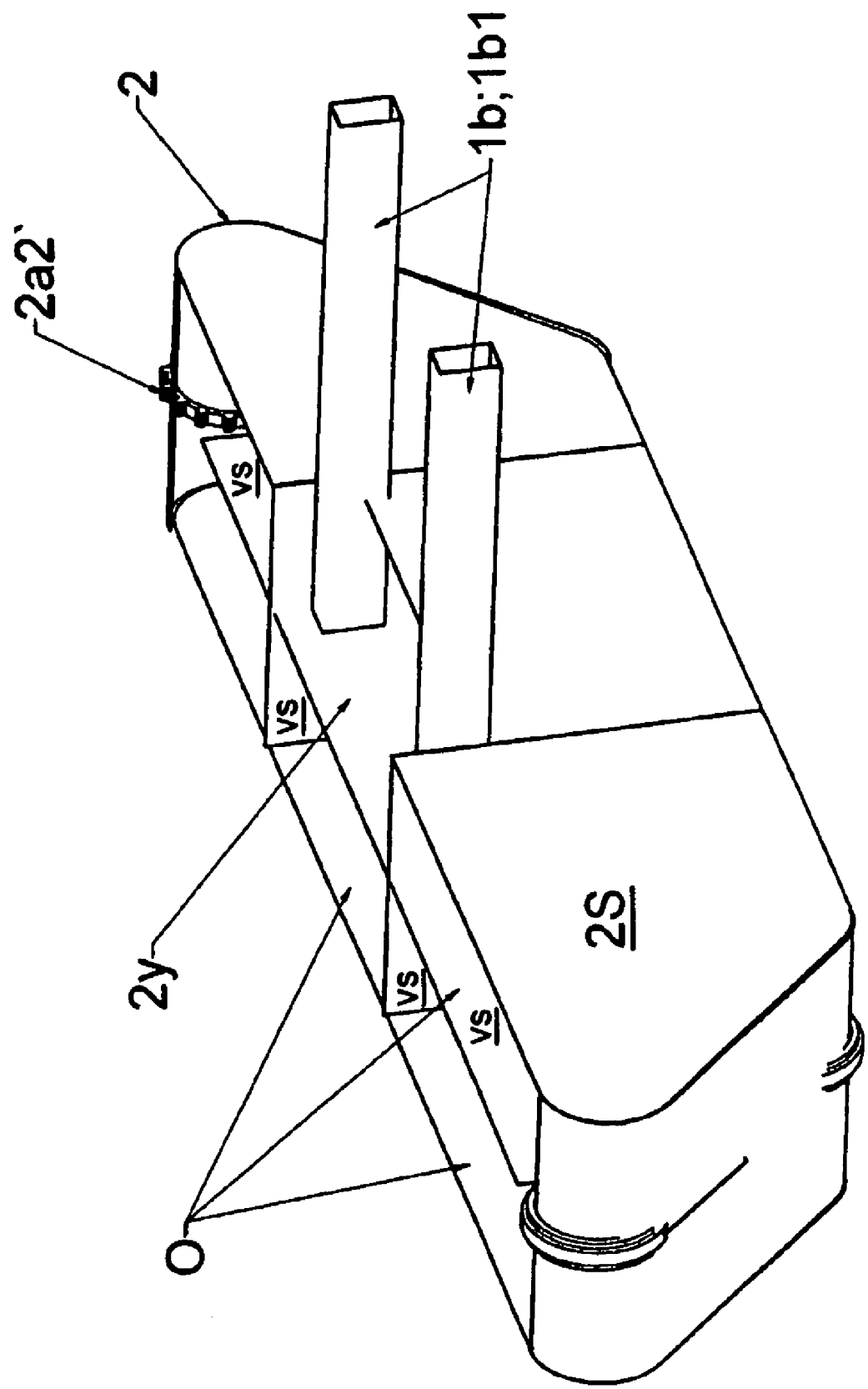
Figures 5A, 5B:
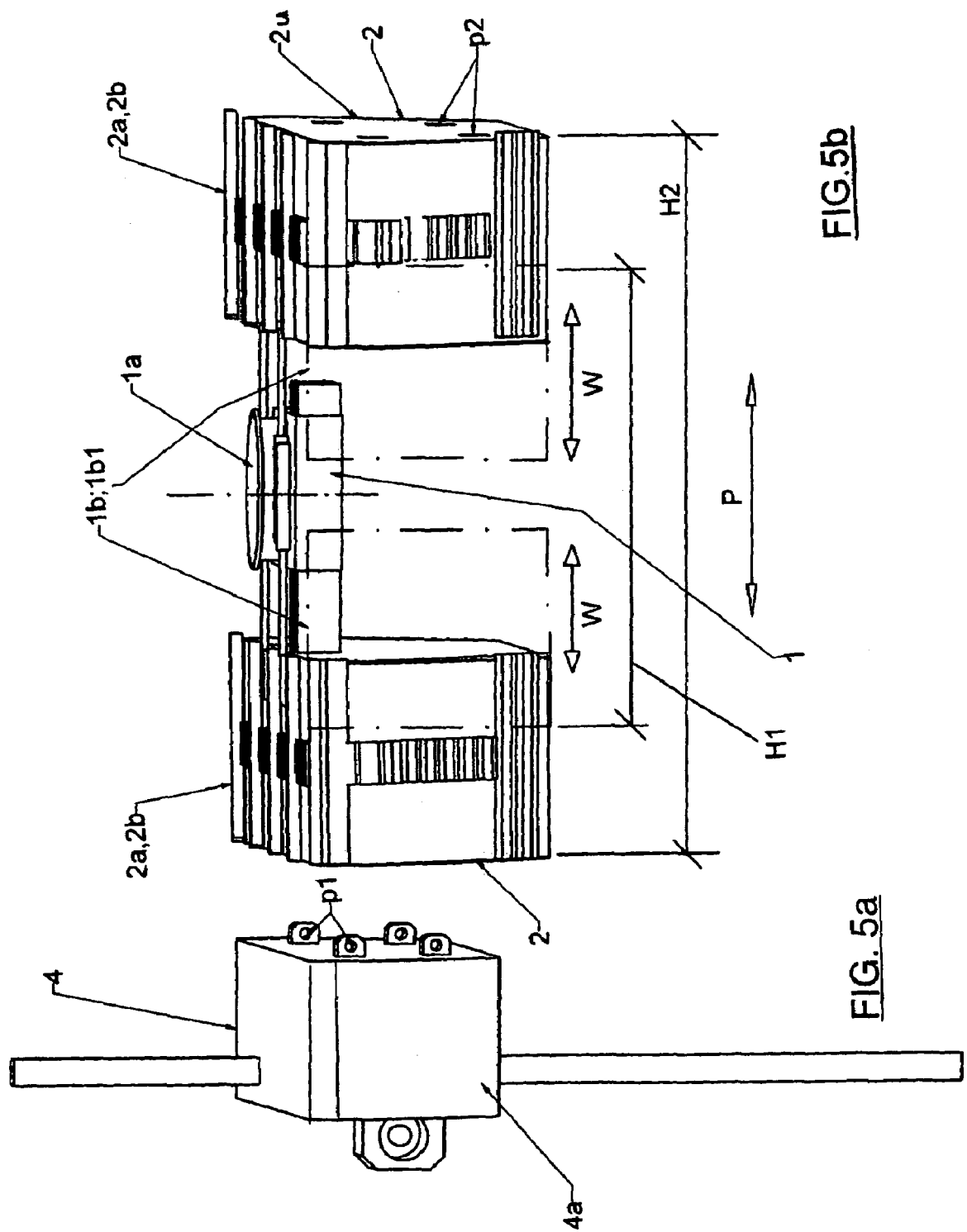

In the following description the invention is depicted in greater detail with reference to the attached drawings, whereby in FIG. 1 is shown an exemplary perspective view of a working machine equipped with a pontoon crawler track according to the invention, FIG. 2 is shown as a perspective view an advantageous composition of a pontoon crawler track assembly according to the invention, FIG. 3 is shown an advantageous operating principle of a power transmission arrangement of a pontoon member, belonging to the pontoon crawler track assembly according to the invention, FIG. 4 is shown as a perspective view a pontoon member belonging to the pontoon crawler track assembly according to the invention, from which the lowermost skin plates of the crawler track arrangement are missing, FIGS. 5a and 5b is shown as a perspective view seen from the front an auxiliary pontoon arrangement, being utilized as an advantageous embodiment in the crawler track assembly according to the invention, and a pontoon crawler track assembly according to the invention, FIG. 6 is shown as a perspective view an auxiliary pontoon belonging to an auxiliary pontoon arrangement as seen from its external side, and FIG. 7 is shown as a perspective view furthermore a pontoon crawler track assembly embodiment enabling adjustment of the operating height of the working machine.

DETAILED DESCRIPTION OF THE INVENTION

The invention relates to a pontoon crawler track assembly, which is intended to be used as a crawler-track-driven undercarriage in a working machine T, such as an excavator, a drilling or a piling machine or like, operating particularly in water, which comprises a mounting frame 1 and pontoon members 2. The mounting frame 1 has coupling means 1a to couple the pontoon crawler track assembly with the working machine T and fastening means 1b for attachment of the box-structured, hollow pontoon members 2 at the sides of the mounting frame 1. Each pontoon member 2 is equipped with a crawler track arrangement 2b, which is arranged moveable by way of an internal power transmission arrangement 2a. Furthermore the breadth of the pontoon crawler track assembly is arranged adjustable. With reference e.g. to FIGS. 1, 2 and 5b, the pontoon crawler track assembly has actuators 3 for adjusting its breadth in a way that a working machine equipped with the pontoon crawler track assembly may be brought, by changing the distance between its pontoon members 2 by means of said actuators, operating by auxiliary power, first of all, as shown particularly in FIG. 5b, into a narrowed position H1 particularly with a view to road transportation or the like and on the other hand into a broadened position H2 particularly with a view to operating in water.

The power transmission arrangement $2a$, existing in the pontoon crawler track assembly, comprises, on the principle shown in FIG. 3, an endless power transmission means $2a1$ in each of its pontoon member 2, such as a chain, formed by pin joints of successive formed parts and that is arranged moveable by means of a wheel arrangement $2a2$, such as a drive wheel $2a2'$ and a turnover wheel $2a2''$ and/or a support wheel arrangement $2a2'''$ or like, on the outer periphery of the pontoon member 2, whereby each successive crawler track part belonging to the crawler track arrangement $2b$ is attached to the endless power transmission means $2a1$. With reference particularly to the general principle shown in FIG. 3, the pontoon crawler track assembly according to the invention comprises one power transmission arrangement $2a$, being placed essentially at the center of each pontoon member 2, whereby each crawler track part of the crawler track arrangement $2b$ is coupled with the power transmission means $2a1$ essentially from its middle. The power transmission arrangement comprises usually also chain tightening arrangements $2a2''''$ as shown in FIG. 3.

Particularly as shown in FIGS. 1, 2 and 5b, the crawler track arrangement $2b$ is formed of first crawler track parts $2b1$ and second crawler track parts $2b2$, the second parts $2b2$ of which are essentially shorter than the first crawler track parts $2b1$ when viewed in a transverse direction p. Furthermore with reference particularly to FIG. 2, the longitudinal s distance e between the first crawler track parts $2b1$ is essentially greater than the total length L of the mounting frame 1, which together with a cavity $2y$, existing in the internal side wall $2s$ of the pontoon member 2, enables withdrawing of the mounting frame 1 partially inside the pontoon member 2 between the first crawler track parts $2b1$.

On the other hand as an alternative solution with respect to the above solution, which gets broadened essentially horizontally, in the solution shown in FIG. 7 the pontoon members 2 of the pontoon crawler track assembly are arranged moveable in the transverse direction p in an angle a deviating essentially from horizontal plane, which makes possible particularly adjustment of the operating height of the working machine.

Particularly with reference to FIGS. 3 and 4, the fastening means 1b are arranged by attachment beams 1b1, being attached to the pontoon members 2 and that may be coupled with the mounting frame 1 in a way enabling their mutual longitudinal p movement w, such as on telescope or slide rail principle or accordingly.

Furthermore as an advantageous embodiment the actuators 3, belonging to the pontoon crawler track assembly for adjustment of its breadth, are arranged by hydraulic cylinders $3a$, which are particularly with reference to FIG. 2 in a power transmitting connection with the mounting frame 1 and the pontoon members 2 and the amount of which corresponds to the amount of attachment beams $1b1$, profitably two pieces per pontoon member 2.

Furthermore as an advantageous embodiment, the pontoon crawler track assembly comprises an auxiliary pontoon arrangement 4 in order to increase the carrying capacity of the pontoon crawler track assembly. With reference particularly to FIGS. 5a, 6 and 7 the auxiliary pontoon arrangement 4 comprises an auxiliary pontoon $4a$, $4a'$ to be connected preferably on quick-release principle such as by fastening lugs p1 and lock fittings p2 in connection with each pontoon member, such as at its outer surface $2u$ and/or above the same (see FIG. 7). When taking advantage of auxiliary pontoons $4a'$ to be placed above e.g. as shown in FIG. 7, they may be installed in their places only in an adequately outward driven positions of the pontoon members 2.

One or several pontoon members 2 of the pontoon crawler track assembly is/are as an advantageous embodiment provided with an anchoring arrangement 4a1, which comprises one or several support beams or like for supporting the bottom of the pontoon crawler track assembly at the bottom and that are operated by auxiliary powered driving means 5 that move the same in respect with the auxiliary pontoon 4a in its direction of height h, and/or with a propeller arrangement for independent moving and enabling the operation of the pontoon crawler track assembly in open water.

Furthermore as an advantageous embodiment the pontoon crawler track assembly comprises a control arrangement X, by means of which use of the actuators 3, the driving means 5 and/or the propeller arrangement is enabled remotely, such as from the working machine's cab or correspondingly. Furthermore a hydraulic system of the pontoon crawler track assembly, such as functioning of the actuators, the driving means 5 and/or the propeller arrangement is arranged profitably by power influence transmitted from the hydraulic system of the working machine T.

Furthermore as an advantageous embodiment, the pontoon members 2 are e.g. as shown in FIG. 4 arranged as partitioned structures by means of compartmentation walls vs, which make sure adequate supporting capacity of the pontoon crawler track assembly inspite of a local damage in the casing of its pontoon member.

Particularly with a view to Nordic countries, the total length of a pontoon crawler track assembly according to the type described above is in usual applications generally approximately 10040 mm at its maximum. Correspondingly the breadth of the pontoon members is advantageously approximately 1550 mm, whereby when using a fastening frame, the breadth of which is approximately 1200 mm, the minimum breadth of the pontoon crawler track assembly in its narrowed position is approximately 3490 mm, which remains below a measure (3005 mm), which e.g. in Finland requires extra wide transportation. Furthermore as depicted above, the pushing force of the hydraulic cylinders, being utilized for adjustment of the breadth of the crawler track assembly, is at its maximum approximately 10000 Newton, which is particularly thanks to the fact that during adjustment of the breadth of the pontoon crawler track assembly e.g. the bucket of an excavator may be exploited, by means of which the side of the undercarriage to be adjusted each time is being lifted up from the ground prior to adjustment of the operating breadth, which minimizes significantly the need for power. Naturally the adjustment of breadth in water takes place easily by adjustments to be performed simply from the cab of the working machine.

It is obvious that the invention is not limited to the embodiments presented or described above, but it can be modified within the basic idea according to the needs and applications needed at any given time. Thus it is naturally clear, that e.g. the coupling means of the working machine as well as the fastening means between the pontoon members and the fastening frame may be carried out by arrangements deviating from those, being presented above. The fastening means may thus be carried out e.g. in a way that the fastening beams, existing in opposite pontoon members, are not actually inside each other. In addition to the above, the fastening arrangements between the auxiliary pontoon arrangement and the pontoon members may be carried out instead of quick-release principle e.g. by usual bolt joints or instead e.g. by certain kind of edge lockings. Additionally the power transmission arrangement in each pontoon member may also be carried out in other ways than on the directive operating principle shown in the attached drawings. Additionally it is naturally possible to equip also the pontoon members with propeller arrangements or provide the auxiliary pontoons correspondingly with partitioned structures.

The invention claimed is:

1. A pontoon crawler track assembly, comprising:
   box-structured hollow pontoon members, each pontoon member comprising a crawler track arrangement and an internal power transmission arrangement configured to move the crawler track arrangement,
   a mounting frame comprising a coupling configured to couple the pontoon crawler track assembly with a working machine, the mounting frame further comprising a fastener configured to attach the pontoon members at sides of the mounting frame,
   actuators configured to adjust a breadth of the crawler track arrangement, and
   first crawler track parts and second crawler track parts, the second parts being shorter than the first crawler track parts in a transverse direction, and wherein a longitudinal distance between the first crawler track parts is greater than a total length of the mounting frame, wherein the longitudinal distance between the first crawler track parts and a cavity arranged in the internal side wall of the pontoon member, enable withdrawing of the mounting frame partially inside the pontoon member between the first crawler track parts.

2. The pontoon crawler track assembly according to claim 1, wherein the power transmission arrangement comprises an endless power transmission in each pontoon member, each endless power transmission comprising pin joints of successive formed parts, the power transmission arrangement further comprising a wheel arrangement configured to move the endless power transmission, the wheel arrangement being arranged on the outer periphery of each pontoon member, whereby each successive crawler track part is attached to the endless power transmission, wherein one power transmission arrangement is arranged essentially at the center of each pontoon member, whereby each crawler track part is coupled with the power transmission assembly essentially from a middle of each pontoon member.

3. The pontoon crawler track assembly according to claim 2, wherein the endless power transmission comprises a chain.

4. The pontoon crawler track assembly according to claim 2, wherein the wheel arrangement comprises at least one of a drive wheel and a turnover wheel or a support wheel arrangement.

5. The pontoon crawler track assembly according to claim 1, wherein the pontoon members are arranged moveable in a transverse direction at an angle deviating from a horizontal plane in order to adjust an operating height of the working machine.

6. The pontoon crawler track assembly according to claim 1, further comprising:
   attachment beams attached to the pontoon members and coupled to the mounting frame so as to enable mutual longitudinal movement of the attachment beams.

7. The pontoon crawler track assembly according to claim 6, further comprising:
   hydraulic cylinders configured to arranged the actuators, wherein the hydraulic cylinders are in a power transmitting connection with the mounting frame and the pontoon members, wherein an amount of the power transmitting connection corresponds to an amount of attachment beams.

8. The pontoon crawler track assembly according to claim 7, wherein the arrangement comprises two attachment beams.

9. The pontoon crawler track assembly according to claim 6, wherein the attachment beams are coupled to the mounting frame on telescope or slide rail.

10. The pontoon crawler track assembly according to claim 1, further comprising:
an auxiliary pontoon arrangement configured to increase the carrying capacity of the pontoon crawler track assembly.

11. The pontoon crawler track assembly according to claim 10, wherein the auxiliary pontoon arrangement comprises an auxiliary pontoon to be connected with a quick-release connection to each pontoon member.

12. The pontoon crawler track assembly according to claim 11, wherein the auxiliary pontoon is connected on an outer surface and/or above each pontoon member.

13. The pontoon crawler track assembly according to claim 10, wherein at least one pontoon member comprises an anchoring arrangement, the anchoring arrangement comprising at least one support beam supporting a bottom of the pontoon crawler track assembly at the bottom, wherein the anchoring arrangement further comprising a drive configured to operate the anchoring arrangement by moving the anchoring arrangement with respect to the auxiliary pontoon in a direction of height of the auxiliary pontoon.

14. The pontoon crawler track assembly according to claim 13, further comprising:
a control configured to remotely enable use of the actuators and/or the drive and/or configured to operate the actuators and/or the drive by power influence transmitted from a hydraulic system of the working machine.

15. The pontoon crawler track assembly according to claim 14, wherein the control is configured to remotely enable use of the actuators and/or the drive from a cab or the working machine.

16. A pontoon crawler track assembly, comprising:
box-structured hollow pontoon members, each pontoon member comprising a crawler track arrangement and an internal power transmission arrangement configured to move the crawler track arrangement;
a mounting frame comprising a coupling configured to couple the pontoon crawler track assembly with a working machine, the mounting frame further comprising a fastener configured to attach the pontoon members at sides of the mounting frame; and
actuators operating by auxiliary power to adjust a breadth of the crawler track arrangement;
wherein the pontoon members are arranged moveable in a transverse direction at an angle deviating from a horizontal plane in order to adjust an operating height of the working machine.

17. The pontoon crawler track assembly according to claim 16, further comprising:
first crawler track parts and second crawler track parts, the second parts being shorter than the first crawler track parts in a transverse direction, and wherein a longitudinal distance between the first crawler track parts is greater than a total length of the mounting frame, wherein the longitudinal distance between the first crawler track parts and a cavity arranged in the internal side wall of the pontoon member, enable withdrawing of the mounting frame partially inside the pontoon member between the first crawler track parts.

* * * * *